United States Patent [19]

Yonaga

[11] 4,291,197

[45] Sep. 22, 1981

[54] REMOTE TELEPHONE SYSTEM

[75] Inventor: Yoshifumi Yonaga, Tokyo, Japan

[73] Assignee: Maruyoshi Sangyo Kabushiki Kaisha, Tokyo, Japan

[21] Appl. No.: 44,069

[22] Filed: May 31, 1979

[30] Foreign Application Priority Data

May 31, 1978 [JP] Japan .................................. 53-64221
Aug. 22, 1978 [JP] Japan ................................ 53-101413

[51] Int. Cl.³ .............................................. H04Q 7/04
[52] U.S. Cl. .................................. 179/2 EA; 179/2 E
[58] Field of Search ................ 179/2 E, 2 EA, 2 EB, 179/18 DA; 325/37, 55, 64

[56] References Cited

U.S. PATENT DOCUMENTS

| Re. 29,183 | 4/1977 | Greneker | 179/2 EA |
|---|---|---|---|
| 3,087,998 | 4/1963 | Stewart et al. | 179/2 EB |
| 3,193,623 | 7/1965 | Buens et al. | 179/2 EA |
| 3,351,714 | 11/1967 | Kunzelman et al. | 179/2 EB |
| 3,476,882 | 11/1969 | Vogelman et al. | 179/2 EA |
| 3,551,815 | 12/1970 | Berman | 179/2 EB |
| 3,581,019 | 5/1971 | Ryan | 179/2 EB |
| 3,590,166 | 6/1971 | Anshutz | 179/2 EB |
| 3,644,681 | 2/1972 | Rice | 179/2 EA |
| 3,754,187 | 8/1973 | Deming | 325/37 |
| 3,912,875 | 10/1975 | Katz | 179/2 EB |
| 4,039,760 | 8/1977 | Gregory et al. | 179/2 EA |
| 4,119,800 | 10/1978 | Girardi | 179/2 EA |

FOREIGN PATENT DOCUMENTS 43-47126 1/1976 Japan .

Primary Examiner—Gerald L. Brigance
Attorney, Agent, or Firm—Armstrong, Nikaido, Marmelstein & Kubovcik

[57] ABSTRACT

This invention relates to a cordless telephone system which includes a radiophone having a radio transmitter and a radio receiver, and a radio station wired to a communication line having a ratio transmitter and a radio receiver.

The radiophone is provided with a means which develops a pulse signal. The means may be a dial thereof, where the pulse signals is to be a dialing signal.

The pulse signal is emitted to the radiophone on a carrier wave.

The radiophone is provided with a means which detects and responds the pulse signal, and also a means which enables or disables a dialing signal demodulator therein as a function of the response of the means.

8 Claims, 12 Drawing Figures

Fig_1

Fig_2

Fig_3

Fig_6

Fig_7

Fig_8-a

Fig_8

REMOTE TELEPHONE SYSTEM

BACKGROUND OF THE INVENTION

This invention relates to a cordless telephone system which consists of a radiophone and a radiostation wired to a communication line, wherein the radiophone and the radiostation include a radio transmitter and a radio receiver respectively.

Figure 1:
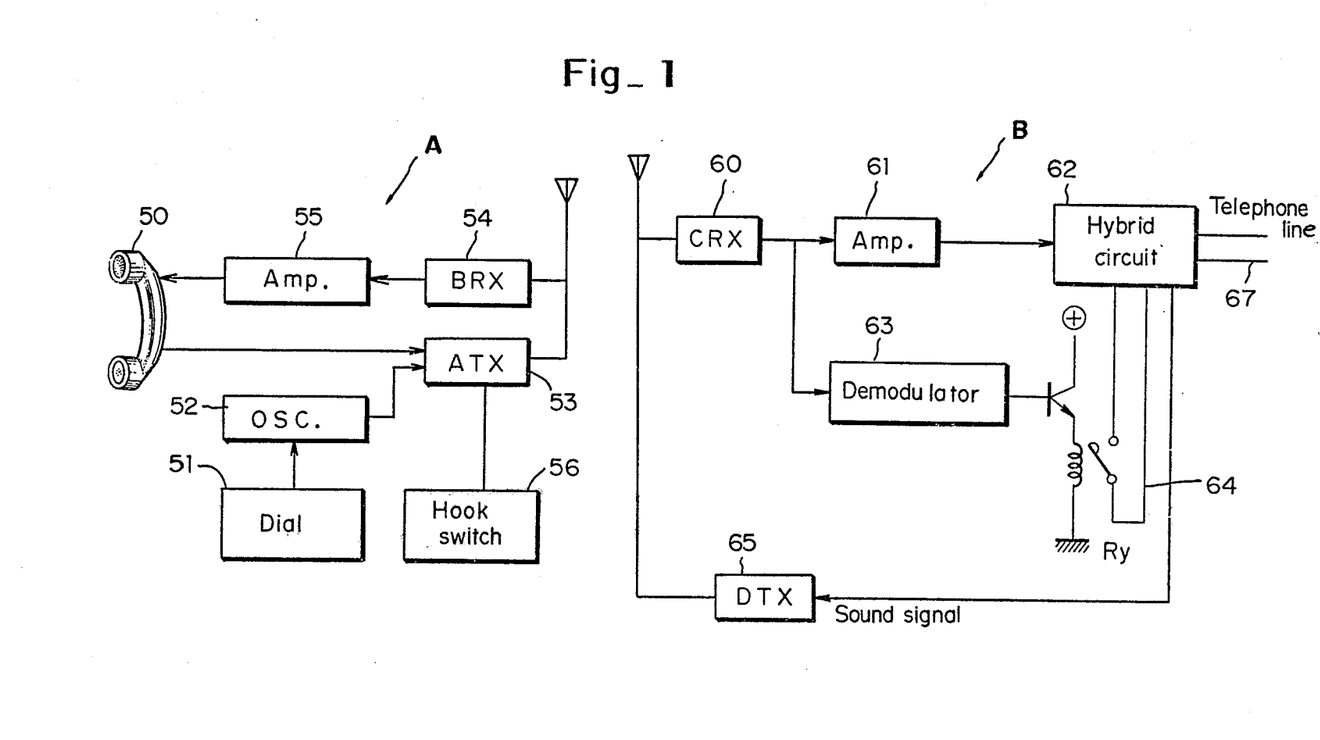
FIG. 1 shows a schematic diagram of the prior art.

FIG. 1 shows a system using a dial which is a typical prior system, in which A indicates a radiophone and B indicates a radiostation. The radiophone comprises a hand set 50, a dial 51 (or a keyboard), a low frequency oscillator 52 connected with the dial (51), a radio transmitter 53, a radio receiver 54, a voice amplifier 55 and also a hook switch 56. A dialing signal, developed by operation of a dial (51), modulates a low frequency wave from a low frequency oscillator (52) which is emitted on a carrier by the radio transmitter 53. A sound signal from the hand set 50 is also emitted on a carrier wave by the radio transmitter 53. The radio station B comprises a radio receiver 60, a sound amplifier 61, a hybrid circuit for a telephone 62 connected to a telephone line 67, a dialing signal demodulator 63, a dialing relay 64, and a radio transmitter 65.

The dialing signal emitted from the radiophone is received by the radio receiver 60, demodulated in the dialing signal demodulator 63 and are then applied to the dialing relay 64 to generate intermittently in accordance with a rotation of a dial (51). Thus, this telephone system is able to communicate with a telephone at a destination side. The sound signals from the radiophone are received by the radio receiver 60 and transmitted to the telephone of a receiving side through the sound amplifier 61 and the hybrid circuit 62. When the telephone of the receiving side transmits sound signals, these signals are emitted on a carrier by the radio transmitter 65 to the radio receiver 54 where the signals are demodulated and transmitted to the hand set 50 through the sound amplifier 55.

With such a telephone system, problems of jamming, tapping, calling a wrong radio-station and etc., may occur because of using radio communication. To prevent these problems, an electric wave of different frequency is employed for each of the devices.

However, it is easy to expect that these problems will occur more frequently, when this cordless telephone equipment or system will be in broad use.

SUMMARY OF THE INVENTION

An object of this invention is to provide a cordless telephone system which may avoid jamming, tapping, calling a wrong a radiostation, wrong usage of a radiostation by another radiophone, and etc. . . .

Another object of this invention is to provide a cordless telephone system in which a radiostation may be enabled by responding only to the operation of a right radiophone. A further object of this invention is to provide a cordless telephone system which may be enabled or disabled by dialing a predetermined number or a predetermined combination of numbers. These and other objects have been attained by the cordless telephone system which comprise a radiophone and a radiostation, wherein the said radiophone includes a means which develops a pulse signal which is emitted by the radio transmitter thereof; the radiostation includes a means which detects the pulse signal received by the radio receiver thereof; and a means which enables or disables a dialing signal demodulator therein, as a function of the said pulse signal detected.

Other objects and advantages of the invention will be more readily apparent from the following detailed description with reference to the accompanying drawings.

BRIEF DESCRIPTION OF THE DRAWINGS

FIG. 8-a shows a time table of the radiophone shown in FIG. 8;

FIG. 9-a shows a time table of the radio station shown in FIG. 9; and,

DETAILED DESCRIPTION OF THE INVENTION

Figure 2:
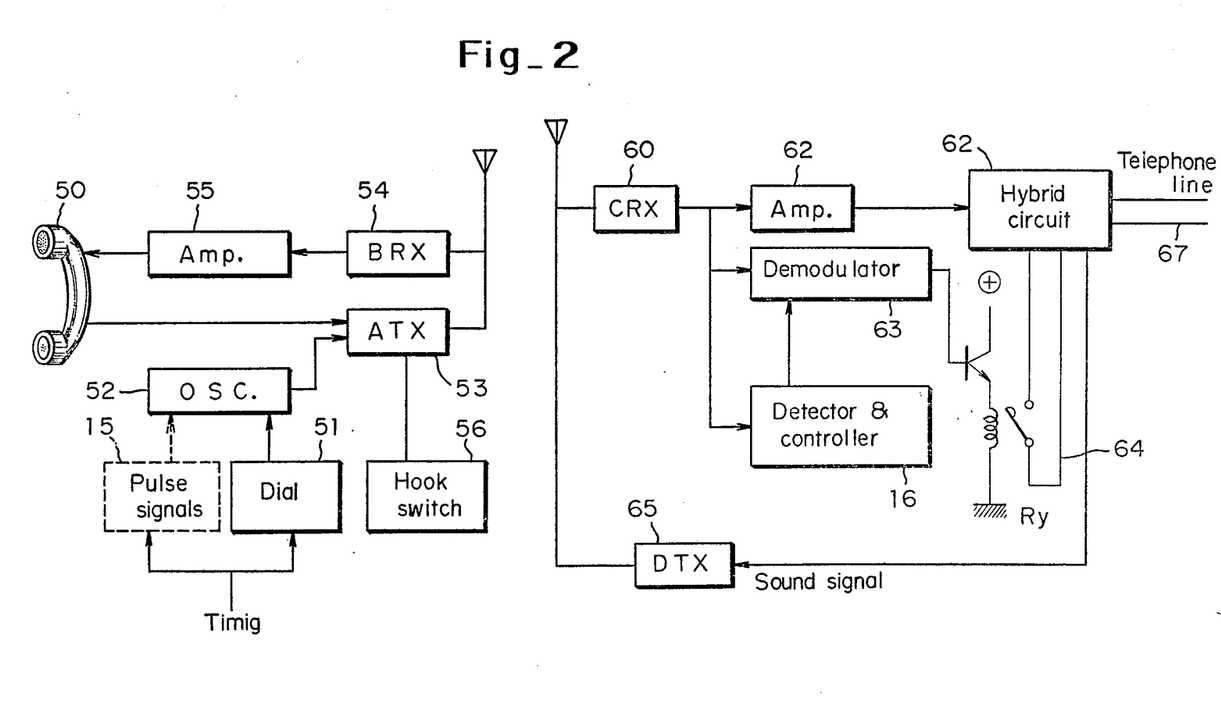
FIG. 2 shows a schematic diagram of a telephone system of the present invention.

FIG. 2 shows a schematic diagram of the inventive conception. A movable radiophone is provided with a means 15 which applies a predetermined or defined pulse signal to a low frequency oscillator 52. A dial 51 may be substituted for the means 15. In this case, a dialing signal corresponding to a predetermined dial number is sent to the oscillator 52 as the predetermined pulse signals. The radiostation is provided with a means 16 which detects said predetermined pulse signals and controls a demodulator 63 in accordance with the defined signals. If wrong signals received by a radio receiver 60 are transmitted, the means 16 will not respond to such signals. That is, the demodulator or demodulation circuit 63 becomes active or inactive only when the defined signals are detected. The development of the defined pulse signals and subsequent emission thereof must be carried out prior to development and emission of dial number signals by operating the dial or the keyboard 51. Consequently the means 15 will be connected to a hook switch 56, otherwise some other means like a button must be provided, which timingly causes the means 15 to develop signals. This timing may be carried out by a first operation of the dial or the keyboard 51. Where the dial 51 is substituted for the means 15, the defined dial number will be dialed before dialing or operating the keyboard 51. The pulse signals from the means 15 or the dial 51 are applied to the low frequency oscillator 52, which produces tone signals modulated by the said pulse signals. The tone signals are subsequently emitted on a carrier wave by the radio transmitter 53. The defined tone signals are detected and decoded in a means 16 after being received by the radio receiver 60. The means 16 applies enabling or disabling signals to the dialing signal demodulator 63 as a function of the pulse signals detected and decoded in the means 16. When being enabled, the demodulator 63 may respond to dial number signals subsequently developed from the dial or the keyboard 51 and intermittently energize the dialing relay 64 according to the signals. Thus the radio station becomes connected with a telephone line 67. Being disabled, the demodulator 63 cannot respond to the dial number signals, that is, the radio station is kept locked.

Figure 3:
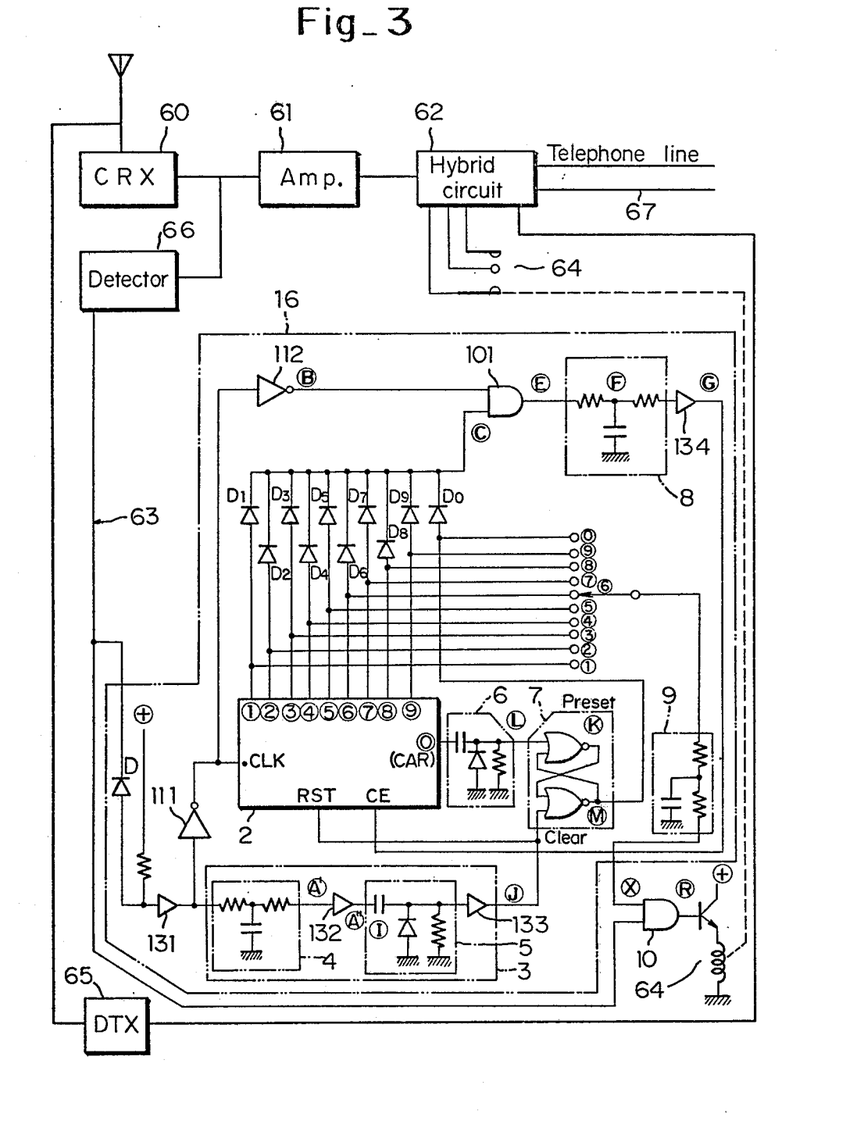
FIG. 3 shows a block diagram of an embodiment of the invention.

FIG. 3 shows an embodiment which uses the dial 51 as a replacement of the means 15 which develops the pulse signals.

The radiophone is not illustrated in FIG. 3 which is the same as the conventional one. 66 indicates a low frequency detector, the input of which is connected to a receiver 60 and the output of which is connected to the dialing relay 64 through an AND gate 10. The detector 66 and the AND gate 10 compose the dialing signal demodulator 63. The means 16 has a decimal counter 2, whose input terminals (CLK) are connected to the detector 66 thorugh an inverter 111, an amplifier 131 and an a diode (D) to receive the dialing signals from the detector 66. A reset terminal (RST) of the counter 2 is connected to the amplifier 131 through a waveform shaping circuit 3. The waveform shaping circuit 3 consists of a delay line 4, amplifiers 132, 133 and a differential circuit 5. Output terminals of the counter 2 are connected to another input of the said AND gate 10 through a delay line 9. Selection of a terminal or terminals which are to be connected to the AND gate 10 depends on selection of a defined dial number or a combination thereof as defined signals. When it is required to enable or disable the demodulator 63 by dialing a dial number "0", for example, at first, a output terminal Ⓞ is connected to the AND gate 67. Because an output from the Ⓞ terminal is a carry output, an output terminal Ⓞ corresponding to a decimal "Zero" is provided to a RS flip-flop 7 and a differential circuit 6, an output Ⓜ of which serves as the Ⓞ output. A clear terminal of the RS flip-flop 7 is connected to the wave-form shaping circuit (3).

Outputs ①-⑨ and the Ⓜ of the counter 2 are connected to an input of an AND gate 101 through diodes Ⓓ1̄ — ⒹⓄ respectively.

The other input of the AND gate 101 is connected to the inverter 111 through an inverter 112. An output of the AND gate 101 is connected with a count enable terminal (CE) of the counter 2 through a delay line 8 and an amplifier 134.

Figure 4:
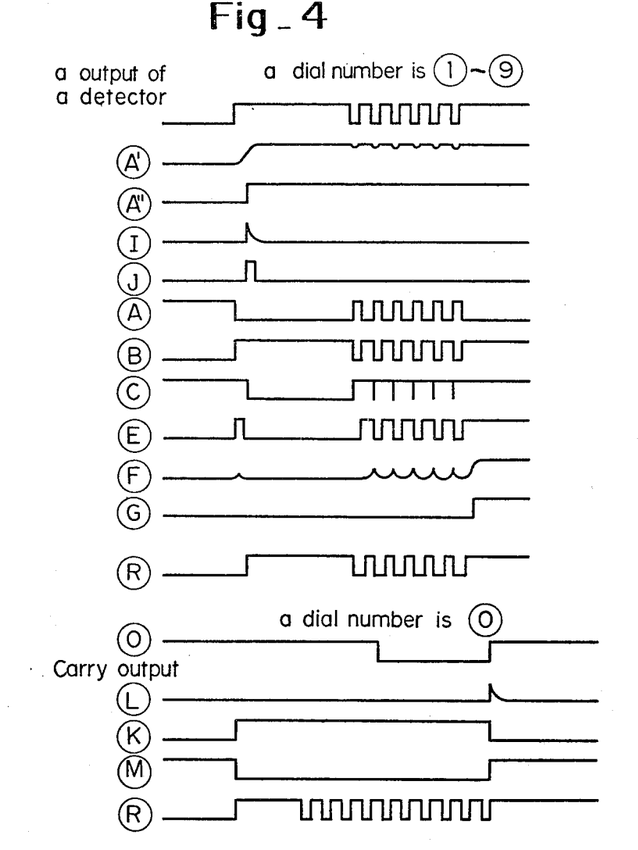
FIG. 4 shows a time table for operation of the embodiment shown in FIG. 3.

Reference will be made to an operation of the embodiment with a time table shown in FIG. 4. When a hand set 50 is lifted up by a subscriber, a carrier wave is emitted from the radio transmitter 53. The carrier wave is received by the radio receiver 60 and demodulated in the low frequency detector 66, whose output subsequently turns to "H". The output is fed through the diode D and an amplifier 131 to the wave-form shaping circuit 3 to supply reset pulse Ⓙ to the counter 2 and RS flip-flop 7 which switches to "reset" in response to the reset pulse Ⓙ. When the dial 51 is subsequently dialed, the dialing signals are emitted from the radio transmitter 53, received by the radio receiver 60 and demodulated by the low frequency detector 66. The dialing signals are transmitted to the input (CLK) of the counter 2 through the diode (D), the amplifier 131 and the inverter 111. The counter 2 counts the dialing signals and applies the signals from the output terminal corresponding to the dialing signals of the defined dial number, to the input (X) of the AND gate 10. Here assume that the defined dial number is "6" for example. When the number "6" of the dial 51 is dialed, the terminals ①—⑤ of the counter 2 supply signals successively and finally the output of the terminal ⑥ turns to "H" which opens the AND gate 10 through the delay circuit 9. Where the defined dial number is "0", the output of the carryout terminal (CAR) turns to "H" at the 10th dialing pulse. The "H" signal renders the differential circuit 6 to supply an Ⓛ pulse to the preset terminal of the RS flip-flop 7, and then output Ⓜ of the flip-flop 7 turns to "H".

The outputs from the terminals of the counter 2 are sumed together at the diodes (D1)—(D0) into an output Ⓒ which is applied to the input of the AND gate 101. The other input of the AND gate 101 receives Ⓑ dialing signals through the inverter 112 so that a logic equation of output Ⓔ = Ⓑ . Ⓒ is carried out. Pulses of short pulsewidth among Ⓔ output signals attenuate passing through the delay circuit 8 and the Ⓔ output turns to Ⓖ output by the amplifier 134. Subsequently Ⓖ output is transmitted to the count enable terminal (CE) of the counter 2 to make the counter 2 inhibited. Thus the means 16 or the counter 2 responds only to the first dial number signals, not to the later dial number signals on and after the second. For example assuming that the defined dial number is "6", the first dialing to number "6" of the dial 51 cause the means 16 to supply signals to open the AND gate 10, that is, to enable the dialing signal demodulator 63, so that the radiostation is connected to the telephone line 67.

It is also possible to disable the demodulator 63, that is, to disconnect communication between the radiostation and the telephone line 67, at the first dialing defined dial number by inverting a logic level of the input X of the AND gate 10. This is very effective to inhibit a long distance telephone call or an international call.

Figure 5:
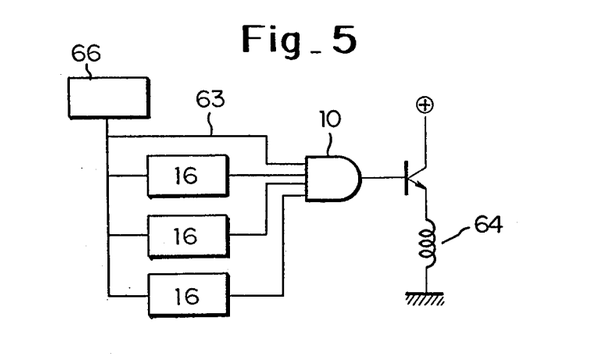
FIG. 5 shows a schematic diagram of another embodiment of the invention.
Figure 6:
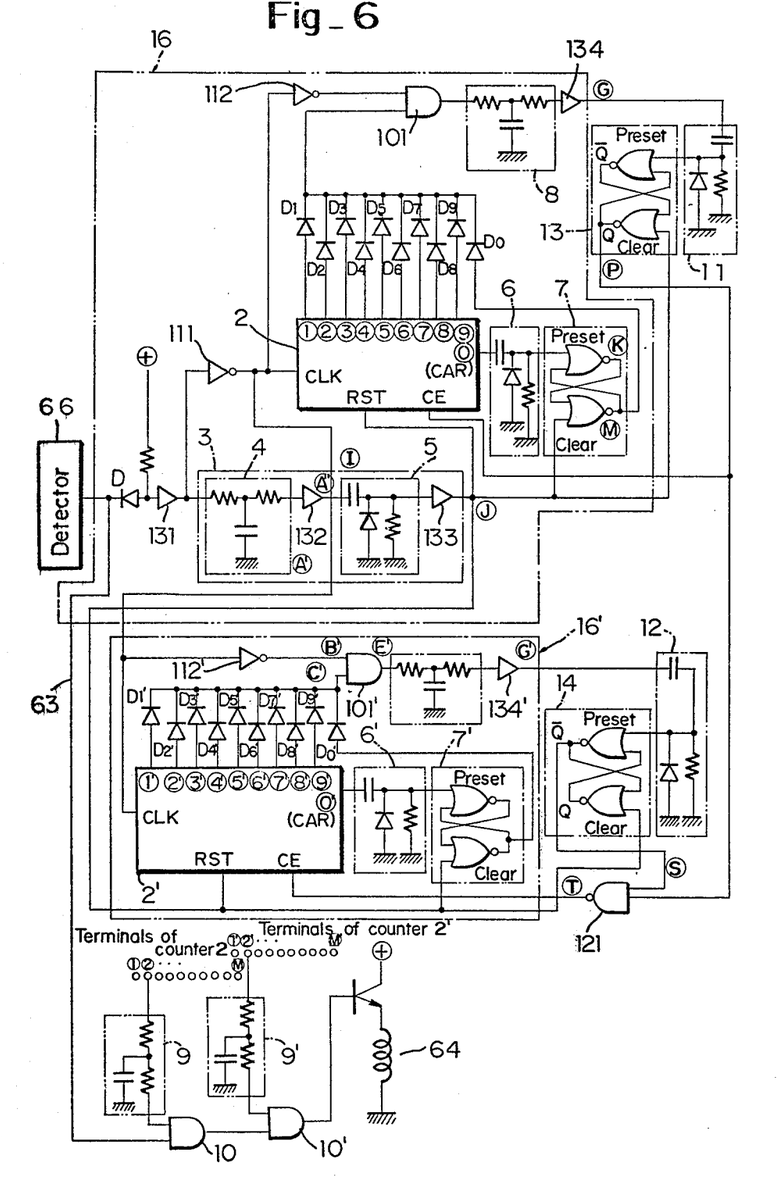
FIG. 6 shows a block diagram of the above embodiment of the invention.

It is also possible to control the dialing signal demodulator 63 by signals of a combination of a defined dial number as shown in FIG. 5, in which the plural means 16 connected in parallel successively turn out acceptable for the one in the defined dial numbers respectively. FIG. 6 shows an embodiment of the invention which includes two means 16 and 16' to control the demodulator 63 by a combination of two defined dial numbers. An input of a second means 16' is connected to the inverter 111 of a first means 16. The diode D, the amplifier 131 and the invetter 111 are also coupled to the second means 16'. A reset terminal (RST) of the second counter 2', a clear terminal of a RS flip-flop 7' and a clear terminal of a RS flip-flop 14 to be described later are connected to the waveform shaping circuit 3 used in common, of the first counter 2. Controlling of count enable (CE) of the counter 2 and 2' is carried out by a following operation.

The output of the amplifier 134 is applied to RS flip-flop 13 through a differential circuit 11, a output terminal (Q) of which is connected to the count enable terminal (CE) of the first counter 2. A clear terminal of the RS flip-flop 13 is connected to the waveform shaping circuit 3.

An output of an amplifier 134' of the second means 16' is also applied to the said RS flip-flop 14 through a differential circuit 12, a output terminal (Q) of which is connected to a count enable terminal (CE) of the second counter 2' through a NAND gate 121. The other input of the NAND gate 121 is connected to the output terminal of the RS flip-flop 13 of the first means 16. An output terminal among ①—⑨ and Ⓜ of the first counter 2 corresponding to the first defined dial number is connected to the input of the first AND gate 10 through the delay circuit 9. The output terminal among 1'—9' and M' of the second counter 2' corresponding to the second defined dial number is also connected to the second AND gate 10'. The other input of the first AND gate 10 is connected to the low frequency detector 66. The other input of the second AND gate is connected to the output of the AND gate 10.

Figure 7:
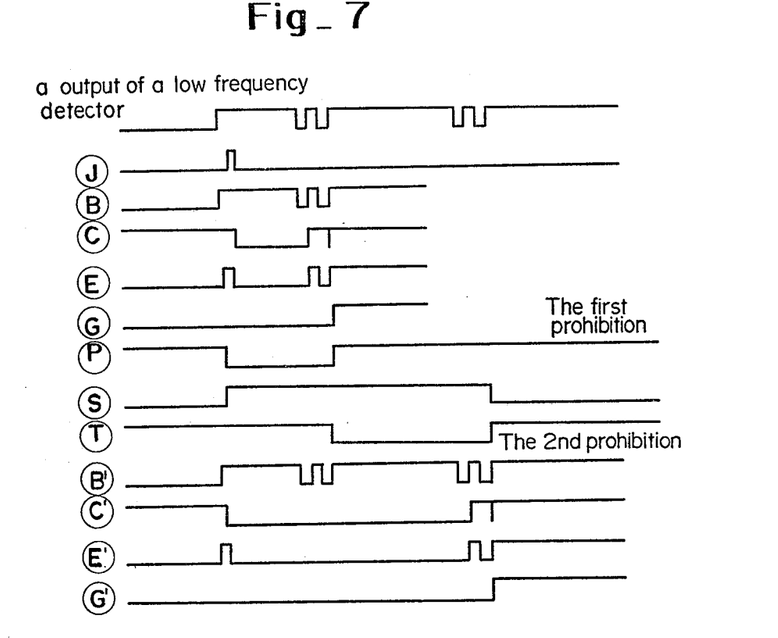
FIG. 7 shows a time table for operation of the embodiment shown in FIG. 6.

FIG. 7 shows a time table of operation. When the output of the low frequency detector 66 turnes to "H", a reset pulse is applied on the output Ⓙ of the waveform shaping circuit 3 and resets the counter 2, 2', the RS flip-flop 7, 7' and the RS flip-flop 13, 14 used for count enabling. An output Ⓟ of the RS flip-flop 13 turns to "L" from "H", an output Ⓢ of the RS flip-flop 14 inverts to "H" from "L", and an output Ⓣ of the NAND gate 121 keeps "H" so that the second conter 2' is prohibited from receiving the dialing signals. The first dialing signal (e.g., a dial number "2") is counted by the first counter 2 and the first AND gate 10 turns out "open" or "close" if the first dialing signal corresponds to the first defined dial number. The output Ⓖ of the amplifier 134 turns to "H" which inverts the output Ⓟ of the RS flip-flop 13 to "H" through the differential circuit 11, and prevents the first counter 2 from receiving signals. The output P is also fed to the input of the NAND gate 121. Since the output S of the RS flip-flop 14 is "H" as mentioned previously at such time, the output of the NAND gate 121 turns to "L" which releases the said prohibition and make the second counter 2' capable for receiving a dial number signal. A dialing number signal corresponding to the second dial number (e.g., number "2") is fed and counted in the second counter 2', and an output of an output terminal ②' turns to "H". Thus, the AND gate 10' opens and enables the dialing signal demodulator 63, or closes and makes it disable. The output Ⓖ' of the amplifier 134' turns out "H" which inverts the output of the RS flip-flop 14 to "L" from "H" through the differential circuit 12. Then the output Ⓣ of the NAND gate turns out "H" which prevents the second counter from receiving and responding to the dialing signal coming later.

The above-mentioned embodiment carries out the connection to the telephone line by dialing a combination of two dial number (e.g., "2" "2") at first. The combination may be changed to another combination of any numbers. It is also possible to combine more than two numbers by increasing the number of the means 16.

Figure 8:
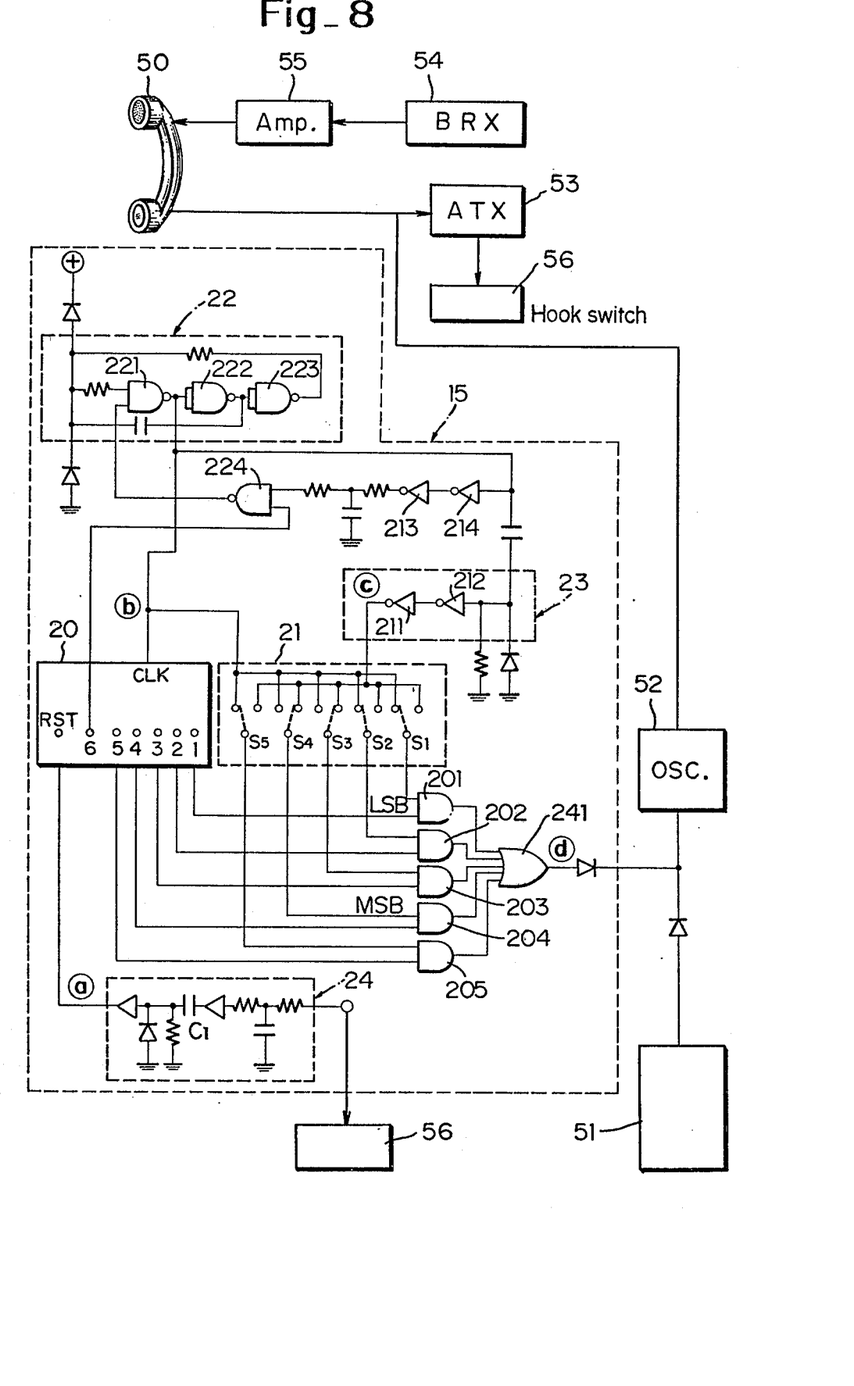
FIG. 8 shows a block diagram of a radiophone according to a further embodiment of the invention.
Figure 9:
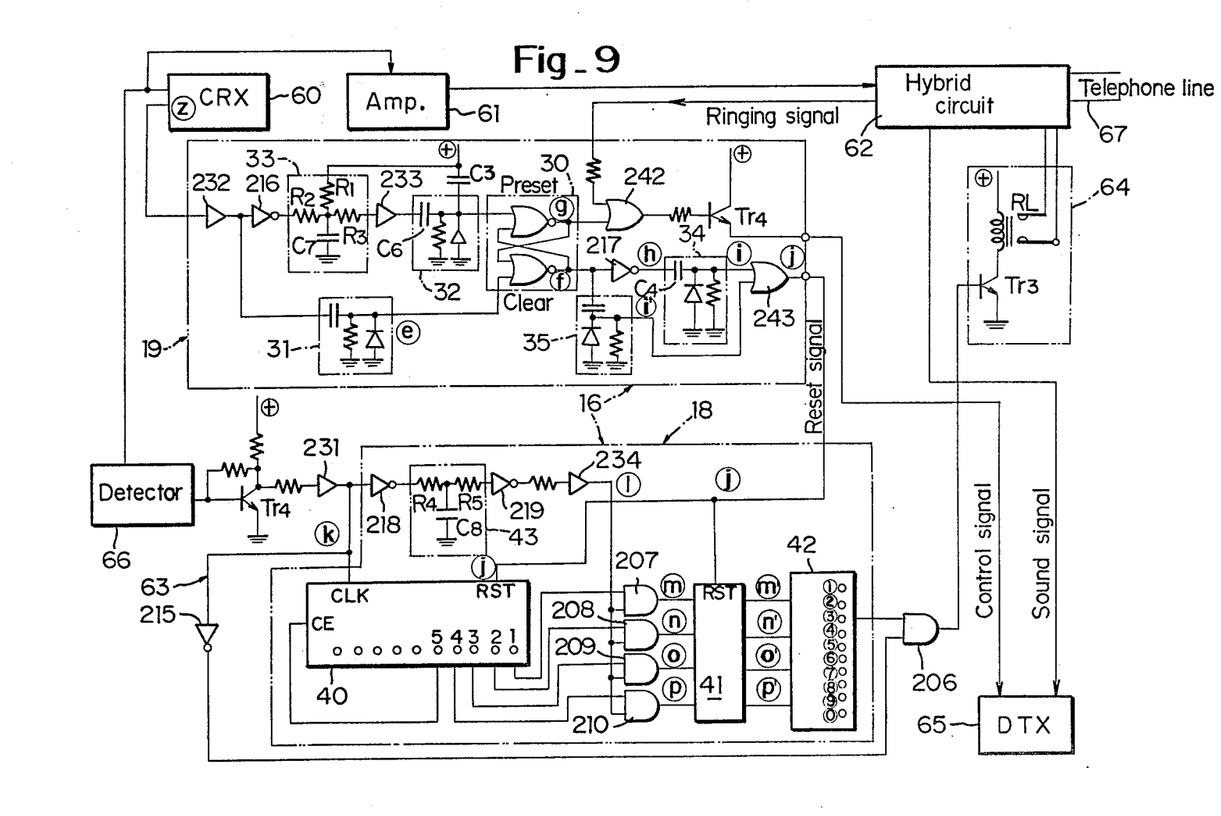
FIG. 9 shows a block diagram of a radiostation accordig to above embodiment of the invention.

FIG. 8 and FIG. 9 show another embodiment of the present invention, which is provided with a means 15 which gererates a pulse signal. FIGS. 8 and 9 show dial telephone equipment but the inventive concept may be applied for telephone eqipment with a key board as a replacement of a dial. FIG. 8 shows a block diagram of a radiophone of the embodiment and, FIG. 9 shows a block diagram of a radiostation of the same. The means 15 in the embodiment is connected to the hook switch 56 which operates it. The means 15 comprises a counter 20, a switch array 21 and pulse generators 22, 23. A reset terminal (RST) of the counter 20 is connected to the hook switch 56 through a waveform shaping circuit 24 so that the counter is reset by a reset pulse from the output of the circuit 24 generated by the lifting of the hook switch 56. The counter 20 is a decimal counter and its output terminals ① ② ③ ④ ⑤ are connected to inputs at one side of AND gates 201 202 203 204 205, respectively. An output terminal ⑥ is connected to a control input side of the pulse generator 22. The generator 22 is an astable multivibrator consisting of NAND gates 221 222 223, whose output is connected to an input terminal (CLK) of the counter (20) and the switch array 21. The pulse generator 23 comprises a differential circuit and inverters 211, 212, and its output is connected to the said switch array 21.

The switch array 21 consists of switches S1, S2, S3, S4, S5 which carry out choice of connections to either the pulse generator 22 or to the pulse generator 23. In the embodiment shown in FIG. 8, the pulse generator 22 develops longer pulsewidth pulses (hereinafter refered to as "long mark pulses"), and the generator 23 develops shorter pulse width pulses (hereinafter referred to as "short mark pulses"). The long mark pulses correspond to a logic "1" and the short mark pulses correspond to a logic "0". Thus, it is possible to construct any desired digital code by operating the switches S1—S5 of the switch array 21. The switches S1—S5 are connected to the other inputs of the AND gates 201—205. The outputs of the AND gates 201—205 are connected to the low frequency oscillator 52 through an OR gate 241.

Figure 8A:
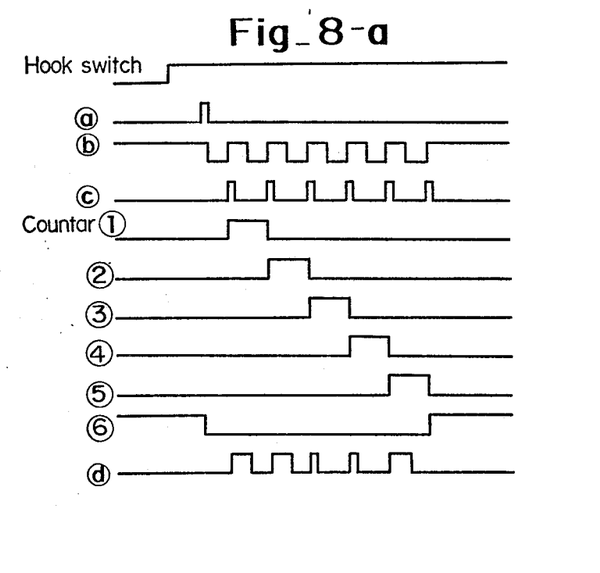

The operation of the means 15 are as follows. FIG. 8-a shows a time table of the operation. When the hand set 50 is picked up, the hook switch 56 is lifted, a pulse appears on an output of the waveform shaping circuit 24 to reset the counter 20. An output of a terminal ⑥ of the counter 20 turns to "L" from "H" which makes an output of the NAND gate 224 turn to "H" so that the pulse generator 22 starts operation. The generator 22 develops the long mark pulses from its output ⓑ to the counter 20 and the switch array 21. The generator 23 simultaneously develops the short mark pulses from an output ⓒ to the switch array 21. The counter 20 counts the pulses and an output of its output terminal ⑥ turns out "H" which causes the NAND gate 224 turn to "L" to stop the operation of the pulse generator 22. In the switch array 21 shown in FIG. 8, the switches S1, S2, S5 are selected to receive the long mark pulses and the switches S3, S4 are selected to receive the short mark pulses. Consequently, where the long mark pulse and the short mark pulse correspond to "1" and "0" respectively, the switches S1—S5 make signals of 1, 1, 0, 0, 1, respectively. The signals of 1, 1, 0, 0, 1 are sent to the AND gates 201—205 which supply outputs to the oscillator 52 when the outputs from the terminals of the counter 20 are fed to the other inputs of the AND gates. Consequently, a signal appearing on an output ⓓ of the OR gate 241 is a serial code of "1, 1, 0, 0, 1,". In this embodiment, the signal from the AND gate 201 is LSB and the signal from the AND gate 204 is MSB so that the output ⓓ of the OR gate 241 issues a signal of a binary code "0011" corresponding to a decimal number "3". The binary code "0011" is used as BCD in the present embodiment. The output from the AND gate 205 will be mentioned later. The pulse generators 22 and 23 can generate pulses more than five or less than five to increase or decrease a quantity of code combinations.

FIG. 9 shows a radiostation of this embodiment. The dialing signal demodulator 63 in FIG. 9 comprises the low frequency detector 66, a transistor Tr 4, an amplifier 231 and an inverter 215. The demodulator 63 is connected to the dialing relay 64 and operates the relay 64 intermittently with respect to a dialing signal. The means 16 includes a decoding section 18 and a carrier buffer 19. The carrier buffer 19 receives a carrier wave from the radio receiver 60 and supplies a reset signal to a counter 40 described later and a controlling signal to the radio transmitter 65. The carrier buffer 19 has a RS flip-flop 30 composed of a pair of NOR gates. A clear terminal of the RS flip-flop 30 is connected to a carrier wave control terminal ⓩ of the radio receiver 60 through a differential circuit 31 and an amplifier 232. An output of the carrier wave control terminal ⓩ turns out "H" when the receiver 60 receives the carrier wave. A preset terminal of the flip-flop 30 is connected to the terminal ⓩ of the receiver 60 through a differential circuit 32, an amplifier 233, a delay circuit 33, an inverter 216 and an amplifier 232. A output ⓖ of the RS flip-flop 30 is connected to the radio transmitter 65 through an OR gate 242 and a transistor Tr4.

An output ⓕ thereof is connected to an one side input of an OR gate 243 through an inverter 217 and a differential circuit 34, and also to the other input of the OR gate 243 through a differential circuit 35. An output of the OR gate 243 is connected to reset terminals of the counter 40 and a latch circuit 41 mentioned later. The other input of the OR gate 242 receives a ringing signal from the hybrid circuit 62.

Figure 9A:
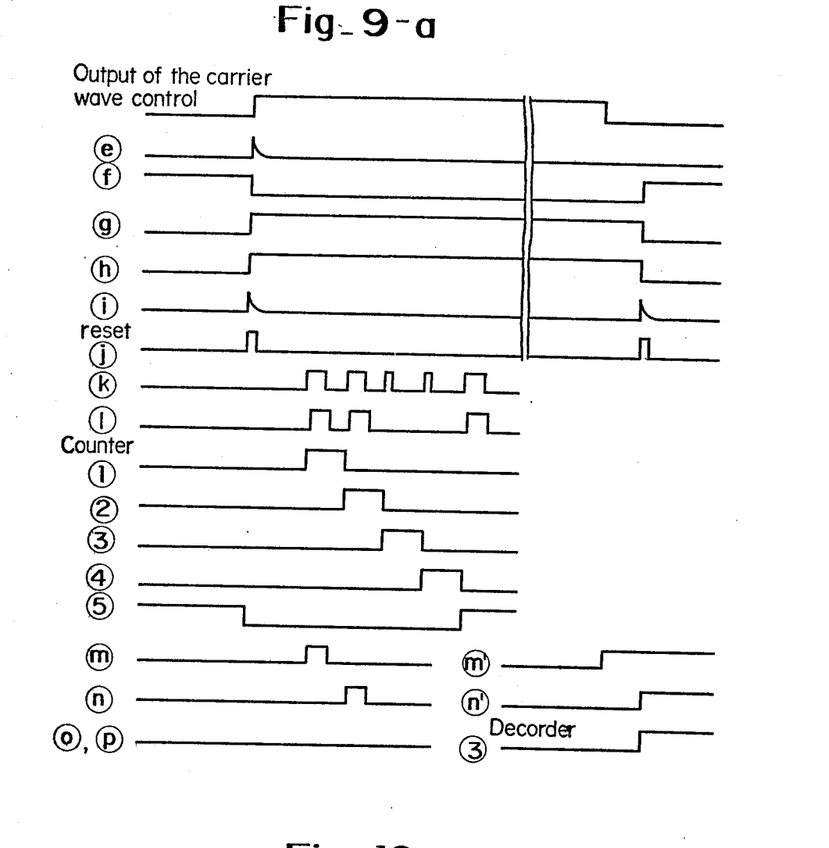

The operation of the carrier buffer 19 is as follows. FIG. 9-a shows a time table of the operation. When the radio receives a signal from the radiophone, an output of the carrier wave control terminal ⓩ turns to "H" which transmits a pulse to the clear terminal of RS flip-flop 30 through the differential circuit 31 and the amplifier 232. An output of the RS flip-flop 30 keeps "L" and an output ⓕ keeps "H", for the RS flip-flop 30 has received a pulse through a capacitor C3 when power is supplied. The pulse to the clear terminal inverts the output ⓖ to "H", the output ⓕ to "L" which makes an output ⓗ of the inverter 17 "H" so that an output ⓘ of the differential circuit 34 provides a pulse to develop a reset pulse from an output ⓙ of the OR gate 243.

The output ⓖ of the RS flip-flop 30 makes the transistor (Tr4) turn "ON" which transmits the controlling signal to enable the radio transmitter 65. When the hand set 50 is put down to the right position and the hook switch 56 goes down after the telephone communication, the output of the carrier wave control terminal ⓩ reverses from "H" to "L" which makes the output of the amplifier 232 turn to "L" and the output of the inverter 216 turns to "H". Then, the output of the amplifier 233 turns to "H" at the time delay by the delay circuit 33 to feed a pulse through the differential circuit 32 to the preset input of the RS flip-flop 30. The outputs of the RS flip-flop 30 reverse, that is, the output ⓖ turns to "L" and the output ⓕ turns to "H" which appears as a pulse on the output ⓘ of the differential circuit 35 to supply the reset pulse from the output ⓙ of the OR gate 243. Thus, the carrier buffer 19 may provide a reset pulse to the decoding section 18 at both the ending and the begining of the telephone communication. The radio transmitter 65 is also be enabled by the ringing signal fed through the OR gate 242.

The decoding section 18 includes a decimal counter 40, a latch circuit 41, a decoder 42 and a delay circuit 43. An input of the counter 40 is connected to the output of the amplifier 231 of the dialing signal demodulator 63 and, receives/counts the pulse code of the long mark pulses and the short mark pulses detected by the detector 66. A reset terminal RST of the counter 40 is connected to the output ⓙ of the OR gate 243 of the carrier buffer 19 and receives the reset pulse. Output terminals ①②③④ of the counter 40 are connected to one of the inputs of AND gates 207 208 209 210, respectively. An output terminal ⑤ is connected a count enable terminal (CE) so that the counter 40 is inhibited at the 5th input pulse. The delay circuit 43 is connected to the amplifier 231 through an inverter 218 and subsides the short mark pulses. Thus, only the long mark pulses are transmitted to the other inputs of the AND gate 207, 208, 209, 210 through an inverter 219 and an amplifier 234. Outputs ⓜ ⓝ ⓞ ⓟ of AND gates 207—210 are connected to the latch circuit 41. A reset terminal RST of the latch circuit 41 is connected to the reset output of the carrier buffer 19. Outputs ⓜ' ⓝ' ⓞ' ⓟ' of the latch circuit 41 are connected to the decoder 42. The decoder 42 is a BCD to decimal code conveter, which has output terminals ① to ⑩ corresponding to decimal numbers respectively. Since the defined decimal code is selected to correspond to decimal number "3" in the embodiment, the terminal ③ is to be connected to one of the inputs of the AND gate 206.

Operation of the means 16 is as follows. FIG. 9-a is a time table 22 thereof. When the output of the carrier wave control terminal ⓩ turns to "H", the said carrier buffer 19 supplies a reset pulse to the counter 40 and the latch circuit 41 which subsequently resets. The pulse code of the long mark pulses and the short mark pulses are fed to the counter 40 which counts the pulses and supplies outputs successively from the terminal ①②③④ to the one of the inputs of the AND gates 207—210. Receiving the 5th pulse, the terminal ⑤ of the counter 40 turns to "H" which subsequently prohibits inputing of the counter 40. Through the inverter 218, the long mark pulses and the short mark pulses are applied the delay circuit 43 which attenuates the short pulses and transmits only the long pulses therefrom. The long mark pulses are fed to the other inputs of the AND gates 207, 208, 209, 210 through the inverter 219 and the amplifier 234. The AND gates 207 208 209 210 output the long mark pulses at the time when the outputs from the counter 40 comes up. Since the digital code is "0011" in this embodiment, the outputs ⓜ ⓝ of the AND gates provides the pulses to the latch circuit 41. The code pulses latched by the circuit 41 are converted to decimal number by the decoder 42, that is, the defined terminal of the decoder 42 turns to "H" which opens the AND gate 206 to enable the dialing signal demodulator 63. In this embodiment, this will be carried out only when the defined pulse code corresponds to decimal number "3", since the input of the AND gate 206 is connected to the terminal 3 of the decoder 42.

Figure 10:
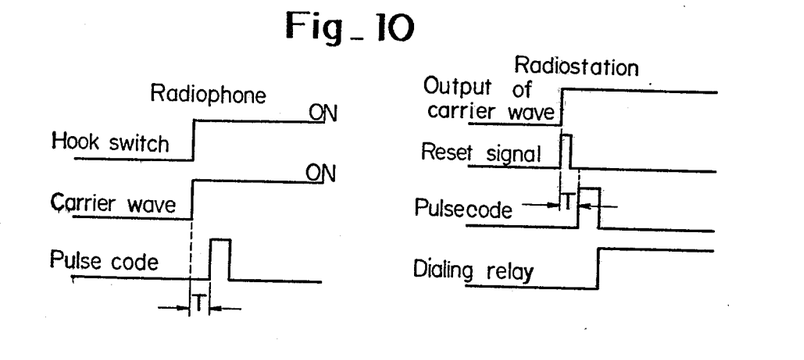
FIG. 10 shows a time table of a telephone equipment shown in FIG. 8 and FIG. 9.

Operation of the radiostation and the radiophone is as follows. FIG. 10 shows a time table. When a subscriber picks up the hand set 50, the hook switch 56 rises up and the radio transmitter 53 starts to emit the carrier wave. The means 15 develops, after the delay time T, the defined pulse code corresponding to the defined number. Subsequently, the low frequency oscillator 52 transmits a tone signal modulated by the pulse code to the radio-transmitter 53 which emits the signal on the carrier wave to the radiostation. Operating the dial 51 subsequently, the dialing signal is issued from the radiophone to the radiostation in the same way as the pulse code. In the above mentioned composition of this embodiment that the carrier wave is modulated by the low frequency modulated by the dialing signal or the pulse code, and this provides a protection against the wrong connection or disconnection of this equipment to the telephone line by false signals or noises.

The signal emitted by the radio transmitter 53 is subsequently received by the radio receiver 60. When the receiver 60 receives the carrier wave, the output of the carrier wave control terminal ⓩ turns to "H" so that the carrier buffer 19 supplies the reset signal which resets the counter 40 and the latch circuit 41, and the controlling signal which enables the radio transmitter 65. The counter 40 and the circuit 41 have been reset in usual condition before the reset signal reaches, because the carrier buffer 19 is composed to supply the reset signal also when the output of the terminal ⓩ turns to "L". Such composition of twice resettings is for a purpose of nose proofing. The pulsecode signal is subsequently received by the receiver 60 and detected by the detector 66 and then transmitted to the means 16. If the pulse code corresponds to the defined decimal number (in this embodiment, number "3"), the output of the defined output terminal (in the embodiment, terminal 3) turns to "H" which opens the AND gate 206 so that the dialing signal demodulator 63 is enabled and acceptable for the dialing signal from the dial 51. The dialing signal drives intermittently desired dialing relay 64 to call the telephone number. When a subscriber puts the hand set 50 on the right position after the communication, the hook switch 56 moves down to stop the transmitter 53. The output of the carrier wave control terminal ⓩ turns to "L" from "H" and the control signal of the transmitter 53 turns down to "L" to stop the transmitter 65. The carrier buffer 19 supplies simultaneously the reset signal which resets the counter 40 and the latch circuit 41.

What I claim is:

1. A remote telephone system comprising a remote station having a remote transmitter and receiver means, and a base station having a base transmitter and receiver means, wherein said remote station includes pulse code means for generating a pulse signal corresponding to at least one predetermined decimal number, said remote transmitter means transmitting said pulse signal to said base radio station, and said base receiver means receiving said transmitted pulse signal, and wherein said base radio station includes discriminator means, coupled to said base receiver means, for determining if said pulse signal corresponds to said at least one predetermined decimal number, a dialing signal demodulator means, and enabling means, responsive to said discriminator means, for enabling said dialing signal demodulator if said transmitted pulse signal corresponds to said at least one predetermined decimal number, and wherein said base station includes counter means for counting the pulses in said pulse signal and for providing an output corresponding to the number of pulses counted; and gate means having one input coupled to the output of said counter means corresponding to said at least one predetermined decimal number and another input coupled to said dial signal demodulator means, whereinsaid base station includes means for disabling said counter means after its response to said pulse signal corresponding to said predetermined decimal number, and means for resetting said counter means in response to a carrier signal from said remote station and wherein the output of said gate means is coupled to a dialing relay means for controlling the opening and closing thereof.

2. A remote telephone system as set forth in claim 1 wherein said at least one predetermined decimal number is at least two decimal numbers and wherein said base radio station counter means includes at least two counters each of said counter means counting the pulses in said pulse signal corresponding to one of said decimal numbers and providing an output corresponding to the number of pulses counted; and said gate means is coupled to all of said counters for producing an output when the outputs of said counters means correspond to said predetermined decimal numbers.

3. A remote telephone system as set forth in claim 2 wherein said base radio station disabling means includes means for disabling all of said counters after their response to said pulse signal corresponding to said predetermined pulse numbers, and said resetting means includes means for resetting all of said counters in response to said carrier signal from said remote station.

4. A remote telephone system comprising a remote station and a base station connected to a telephone line, said remote station comprising a dial means, first transmitter means, first receiver means, first pulse generator means for generating first pulses having a long pulse width, second pulse generator means for generating second pulses having a short pulse width wherein said first pulses represent one of a logic 1 or 0 and said second pulses represent the other of said logic 1 or 0, and encoder means for combining the outputs of said first and second pulse generator means in a predetermined sequence to produce a binary coded decimal signal corresponding to a predetermined decimal number wherein the output of said encoder means is transmitted to said base station by said first transmitter means; and said base station comprises a second transmitter means, a second receiver means, detector means for detecting said binary coded decimal signal, a dialing signal demodulator means, and enabling means coupled to said detector means for enabling said dialing signal demodulator means in response to the detection of said binary coded decimal signal by said detector means.

5. A remote telephone system as set forth in claim 4 wherein said encoder means includes means for sampling said first and second pulses and providing a series of pulses corresponding to said predetermined decimal number; and wherein said detector means includes means for converting said encoded serial pulses into encoded parallel pulses, and decoder means for decoding said parallel pulses and wherein said enabling means includes gate means having an input coupled to said decoder means.

6. A remote telephone system as set forth in claim 4 wherein said encoder means includes counter means having parallel outputs for counting said first pulses, switch array means for selectively sampling one of said first or second pulses and providing a code of parallel pulses corresponding to said predetermined decimal number, and AND gate means coupled to said counter means and said switch array means for receiving the outputs thereof and providing a series of pulses corresponding to said predetermined decimal number; and wherein said detector means includes means for converting said series of pulses into parallel encoded pulses and decoder means for decoding said parallel encoded pulses and wherein said enabling means includes gate means.

7. A remote telephone system as set forth in claim 6 wherein said remote station includes hook switch means for resetting said counter means and initiating operation of said first pulse generator means.

8. A remote telephone system as set forth in claim 4 wherein said encoder means includes means for selectively sampling one of said first or second pulses and providing a code of serial pulses corresponding to said predetermined decimal number; and wherein said detector means comprises counter means having a plurality of output terminals for counting said serial pulses, delay means for receiving said serial pulses and eliminating said second pulses therefrom, AND gate means having the inputs thereof coupled to said counter means and said delay means, and binary to decimal converter means coupled to said AND gate means for converting the output thereof to a decimal signal, and wherein said enabling means includes gate means for receiving said decimal signal.

* * * * *